United States Patent [19]

Van de Gang

[11] Patent Number: 4,995,978
[45] Date of Patent: Feb. 26, 1991

[54] HOLDER FOR INCLINING A COFFEE CARTRIDGE

[75] Inventor: Harold P. Van de Gang, Groningen, Netherlands

[73] Assignee: U.S. Philips Corp., New York, N.Y.

[21] Appl. No.: 406,823

[22] Filed: Sep. 12, 1989

Related U.S. Application Data

[63] Continuation of Ser. No. 118,091, Nov. 15, 1987, abandoned.

[30] Foreign Application Priority Data

Nov. 12, 1986 [NL] Netherlands ................... 8602863

[51] Int. Cl.⁵ ......................................... B01D 29/085
[52] U.S. Cl. .................................... 210/474; 210/477; 99/306; 99/318; 206/0.5
[58] Field of Search ............... 210/453, 455, 469, 473, 210/474, 477, 478, 479, 480, 481, 495; 426/77, 82; 99/279, 295, 299, 304, 305, 306, 317, 318, 319, 323; 206/0.5

[56] References Cited

U.S. PATENT DOCUMENTS

| | | | |
|---|---|---|---|
| 2,027,272 | 1/1936 | Flood | 210/480 |
| 2,728,670 | 12/1955 | Young et al. | 426/82 |
| 2,907,052 | 10/1959 | Louis et al. | 99/299 |
| 3,171,625 | 3/1965 | Hughes | 210/474 |
| 3,590,723 | 7/1971 | Dokas et al. | 99/299 |
| 3,610,132 | 10/1971 | Martin et al. | 99/295 |
| 3,694,235 | 9/1972 | Siegel | 99/295 |
| 3,983,797 | 10/1976 | Wurm | 99/306 |
| 4,443,481 | 4/1984 | Donarumma et al. | 426/77 |
| 4,697,502 | 10/1987 | English et al. | 99/299 |
| 4,843,955 | 7/1989 | Herr et al. | 99/299 |

FOREIGN PATENT DOCUMENTS 0190912 8/1986 European Pat. Off.
374729 6/1932 United Kingdom.

Primary Examiner—Richard V. Fisher
Assistant Examiner—Wanda L. Millard
Attorney, Agent, or Firm—Ernestine C. Bartlett

[57] ABSTRACT

A filter device has a coffee-cartridge holder (11) constructed to receive a coffee cartridge (1) having two facing walls (2, 3) made of a filter material, one of said walls (2) being adapted to receive water (8) for making coffee. In order to prevent the foam formed during the extraction process from excessively influencing the extraction time, it is proposed to provide the coffee-cartridge holder (11) or the coffee cartridge (1) or both with means which ensure that, when the holder is in the operating position and containing the coffee cartridge, the wall (2) of a filter material to which water is supplied is inclined at an angle between 15 and 90 to the horizontal.

11 Claims, 2 Drawing Sheets

HOLDER FOR INCLINING A COFFEE CARTRIDGE

This is a continuation of application Ser. No. 118,091, filed Nov. 5, 1987, now abandoned.

FIELD OF THE INVENTION

The invention relates to a filter device comprising a coffee-cartridge holder constructed to receive a coffee cartridge having two facing walls made of a filter material, one of said walls being adapted to receive water for making coffee.

BACKGROUND OF THE INVENTION

A known coffee-cartridge holder is constructed to receive a coffee cartridge whose walls of a filter material between which the ground coffee is present extend horizontally when the cartridge holder is placed on a cup. Coffee is brewed by pouring hot water onto the coffee cartridge in the holder and the brew is received in the cup.

A problem associated with this coffee-filtering method is that during the extraction process foam accumulates in the coffee cartridge between the surface of the ground coffee and the upper one of the horizontally disposed filter walls. This foam presents an additional resistance to the water flowing through, so that the extraction time, i.e. the time taken by the water to flow through the coffee cartridge, is long.

It is the object of the invention to improve the filter device in such a way that the foam produced during the extraction process does not affect or only slightly affects the extraction time.

SUMMARY OF THE INVENTION

To this end the invention is characterized in that the coffee-cartridge holder and/or the coffee cartridge is or are provided with means which ensure that, when the holder contains a coffee cartridge and is in the operating position, the wall of a filter material to which the water is supplied is inclined at an angle between 15° and 90° to the horizontal.

As a result of the inclined position of the filter wall the foam accumulates in the upper part of the cartridge and thus does not impede the flow of hot water through the ground coffee and the filter walls in the part underneath it.

Suitably, the wall of a filter material to which the water is supplied is flat.

A preferred embodiment of the filter device, in which the coffee cartridge comprises a tin-shaped housing, the facing walls of a filter material constituting the lower wall and the upper wall of the tin and being interconnected by an upright peripheral wall is characterized in that the upright peripheral wall is provided with a projecting supporting rim which is inclined relative to the filter wall to which water is supplied. When such a coffee cartridge is placed in a cartridge holder of otherwise known construction the upper filter wall automatically assumes an inclined position.

Another filter device in accordance with the invention, which is adapted for use in an electric coffee maker, is characterized in that the means comprise a chamber whose walls enclose the coffee cartridge, which chamber comprises an end wall situated opposite the wall of a filter material to which water is supplied, and the cartridge holder further comprises a receptacle for hot water from the coffee maker, the bottom of said receptacle being formed with a discharge aperture which communicates with a space between said end wall of the chamber and the wall of a filter material to which water is supplied.

A preferred embodiment of said filter device is characterized in that two chambers are provided, which chambers are each adapted to receive a coffee cartridge and have a common end wall, and in that the bottom of the receptacle is formed with two discharge apertures which each communicate with said space in the respective chamber.

A further embodiment is characterized in that a spring-loaded valve is arranged in each of said discharge apertures, each valve being actuated by a wall portion of the coffee cartridge when placed in the chamber. This enables either one or two coffee cartridges to be placed in the filter device, as desired.

Suitably, the coffee-cartridge holder can be placed in an outer vessel of the filter device, which outer vessel has one or two discharge apertures.

BRIEF DESCRIPTION OF THE DRAWINGS

An embodiment of the invention will now be described in more detail, by way of example, with reference to the accompanying drawings. In the drawings.

DESCRIPTION OF THE PREFERRED EMBODIMENTS

Figure 1:
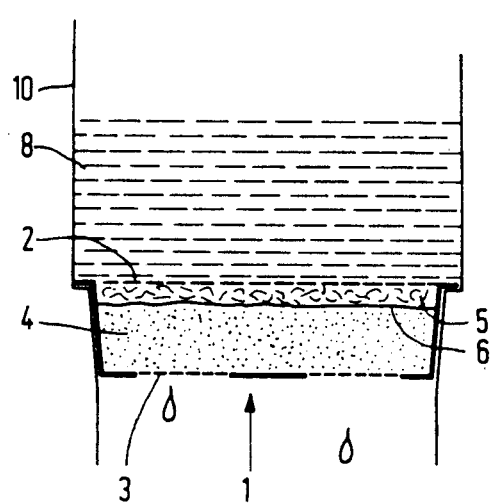
FIG. 1 diagrammatically shows a coffee-cartridge holder containing a prior-art coffee cartridge, FIG. 2 diagrammatically shows a coffee-cartridge holder containing a coffee cartridge in accordance with the invention.

FIG. 1 diagrammatically shows a known situation of a holder 10 containing a coffee cartridge 1. The coffee cartridge 1 is constituted by a kind of tin (see FIG. 4) whose circular upper and lower walls 2, 3 are made of a filter material. The cartridge contains an amount of ground coffee 4. In the position shown, which corresponds to the operating position, the upper filter wall 2, which is the filter wall to which hot water is supplied, occupies a horizontal position. During the extraction process foam is produced and accumulates between the surface 6 of the ground coffee and the entire upper filter wall 2, causing the resistance to the infused water 8 to increase and the extraction time to become longer than without the accumulation of foam.

Figure 2:
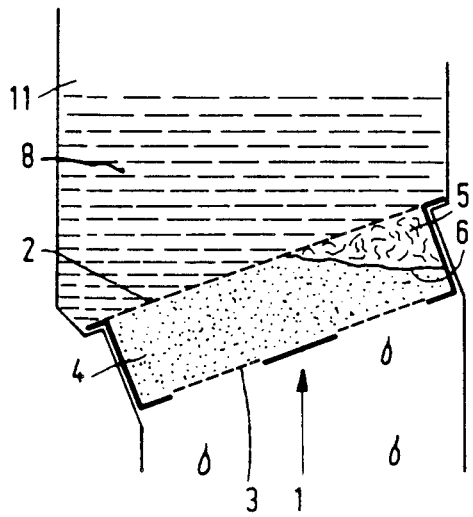
Figure 3:
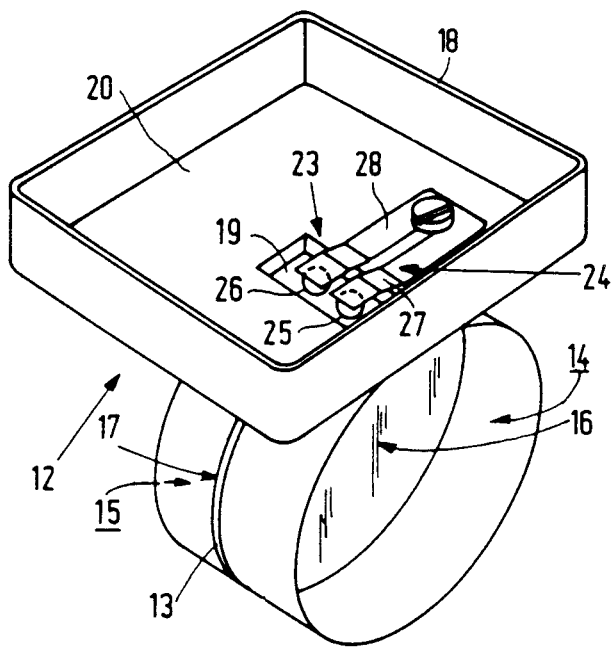
FIG. 3 is a perspective view of another coffee-cartridge holder.

FIG. 2 diagrammatically illustrates the situation in accordance with the invention. The coffee cartridge 1 is arranged in the holder 11 in such a way that in the operating position the filter wall 2 to which water 8 is supplied occupies a non-horizontal position. The foam 5 now accumulates between the surface 6 of the ground coffee 4 and a much smaller part of the filter wall 2.

This is because the remainder of the filter wall is in direct contact with the ground coffee. Since now only a small part of the surface presents an additional resistance to flow the extraction time will be smaller. Obviously, the degree of filling of the coffee cartridge (amount of ground coffee) and the angle of inclination of the filter wall are factors which influence the extraction time. A vertical position is found to be most favourable.

In the following example, described with reference to FIGS. 3-6, relates to a coffee-cartridge holder in which the filter wall to which water is supplied is in a vertical position and which is adapted for use in an electric coffee maker.

Figure 4:
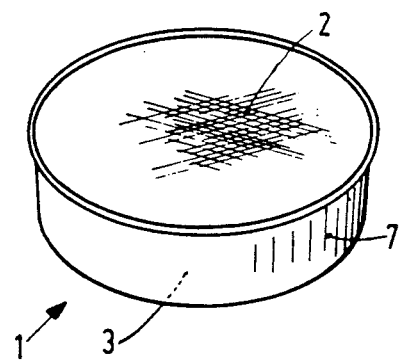
FIG. 4 is a coffee cartridge adapted to be placed in the holder shown in FIG. 3.
Figure 5:
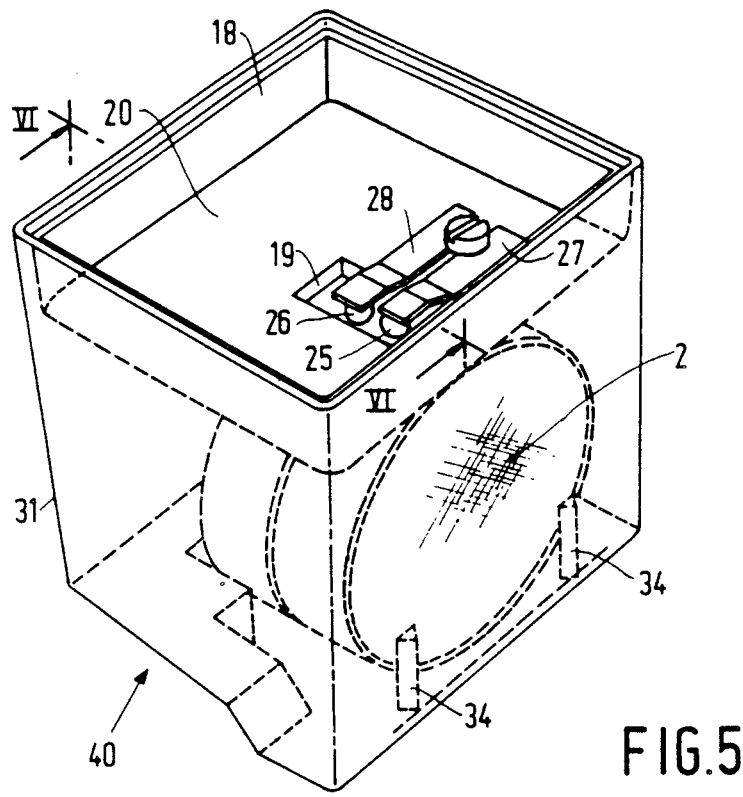
FIG. 5 is a perspective view of a filter device of a coffee maker in which the cartridge holder containing one coffee cartridge as shown in FIGS. 3 and 4 is placed.
Figure 6:
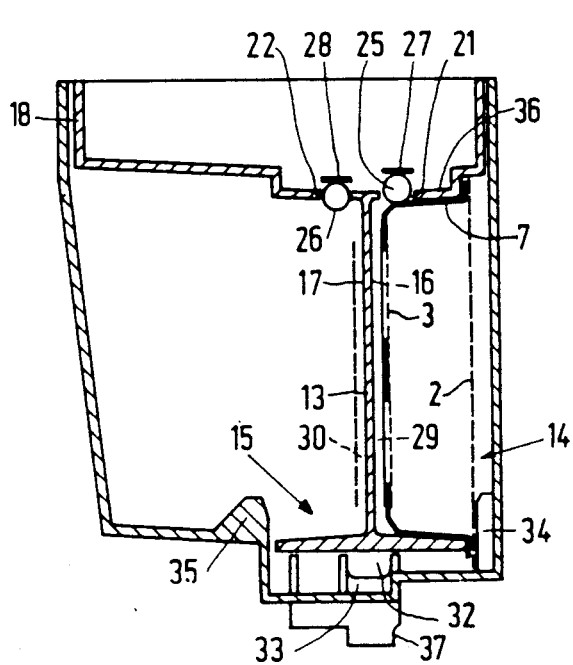
FIG. 6 shows the filter device in a cross-sectional view taken on the line VI—VI in FIG. 5, and FIG. 7 diagrammatically shows a coffee-cartridge holder containing a coffee cartridge in accordance with the invention.

The coffee-cartridge holder 12 comprises a cylinder in which a cylindrical chamber 14, 15 is formed on opposite sides of a partition 13. The two chambers are open at the sides which are remote from the partition. Consequently, the partition constitutes the end walls 16, 17 of the chambers. A, a coffee cartridge 1 as shown in FIG. 4, can be inserted in one or in both chambers as desired. Further, the cartridge holder has a receptacle 18 for hot water. A recessed portion 19 in the bottom 20 of this receptacle is formed with two discharge apertures 21 and 22 which form the connection between the receptable 18 and the chambers 14 and 15 respectively (see FIG. 6). Each of said discharge apertures 21, 22 can be opened or closed by means of a spring-loaded valve 23, 24. Each valve is constituted by a ball 25, 26 which closes the discharge opening 21, 22 under the influence of a leaf spring 27, 28. When a coffee cartridge 1 is placed in a chamber 14, 15 a peripheral wall 7 of the coffee cartridge presses the ball 25, 26 upwards against the force of the leaf spring, thereby opening the discharge aperture 21, 22. Thus, hot water can flow from the receptacle 18 into the chambers 14 and/or 15 via the discharge apertures 21 and/or 22, i.e. first into the spaces 29 and/or 30 between the end walls 16 and 17 respectively and the filter wall 3 of each of the coffee cartridges. From these spaces the water flows through the filter wall 3 into the coffee cartridge and the coffee brew thus obtained leaves the cartridge via the filter wall 2. It is to be noted that although the coffee cartridge of FIGS. 3 to 6 is the same as that shown in FIGS. 1 and 2 the direction in which the water flows through the coffee cartridge is exactly the reverse. This means that in FIGS. 3 to 6 the filter wall 3 is the wall to which water is supplied. However, for the operating principle this is irrelevant.

Such a coffee-cartridge holder may be constructed in such a way that it is placed directly onto a cup so that the coffee brew is received in the cup.

However, in the present example (FIGS. 5, 6) the coffee cartridge is adapted to be placed in an outer vessel 31 of a filter device 40 which forms part of an electric coffee maker, not shown. The outer vessel and the cartridge holder are adapted to one another, so that when the cartridge holder containing one or two coffee cartridges is inserted, these cartridges are correctly retained in the respective chambers. The means for this comprise a projection 32 which is situated centrally underneath the cartridge holder and which engages in a recess 33 in the bottom of the outer vessel and two projections 34 an 35 in the outer vessel. As a result of the location of the projections each coffee cartridge is retained in its chamber in such a way that no or hardly any water flows between the cylindrical wall 36 of the chamber and the wall 7 of the cartridge, i.e. in such a way that all the water passes through the coffee cartridge. The cartridge holder is formed with one or two discharge apertures 37. In the case of two discharge apertures these are situated so close to each other that at the user's portion, one cup can be placed underneath both discharge apertures or two cups can be placed adjacent one another, one underneath each discharge aperture.

Figure 7:
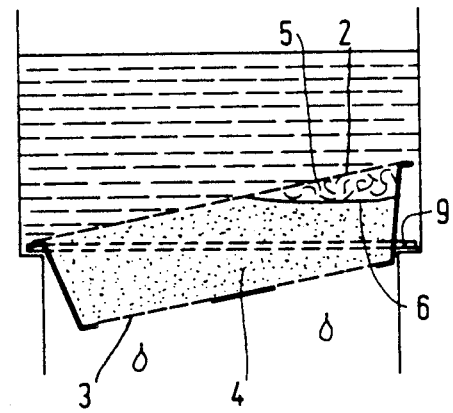

In the example described above the means which ensure that in the operating position the cartridge wall with a filter material to which water is supplied occupies a nonhorizontal position are arranged on the cartridge holder. However, alternatively the coffee cartridge may be provided with means which enable the same object to be achieved. FIG. 7 shows an example of this. The coffee cartridge 1 is provided with a rim 9 which is inclined relative to the filter wall 2 to which water is supplied. In the operating position this rim occupies a horizontal position, so that the filter wall 2 automatically assumes an inclined position.

Obviously, it is also possible to use a combination of means arranged both on the holder and the cartridge.

What is claimed is:

1. A filter device comprising a coffee-cartridge holder constructed to receive a coffee cartridge having two facing walls made of a filter material, one of said walls being flat and adapted to receive water for making coffee, the device also comprising means which ensure that, when the holder contains a coffee cartridge and is in the operating position, the wall of the filter material to which water is supplied is inclined at an angle between 15° and 90° to the horizontal, and wherein the coffee cartridge comprises a housing, the facing wall of a filter material constituting the upper and the lower wall of the housing and being interconnected by an upright peripheral wall, the upright peripheral wall being provided with a projecting supporting rim which is inclined relative to the filter wall to which water is supplied.

2. A filter device as claimed in claim 1, wherein two chambers are provided, which chambers are each adapted to receive a coffee cartridge and have a common end wall, and in that the bottom of the receptacle is formed with two discharge apertures which each communicate with said spaces in the respective chamber.

3. A filter device as claimed in claim 2, wherein a spring-loaded valve is arranged in each of said discharge apertures, each valve being actuated by a wall portion of the coffee cartridge when placed in the chamber.

4. A filter device as claimed in claim 2, characterized in that the filter device is provided with an outer vessel in which the cartridge holder can be placed, which outer vessel is formed with one or two discharge apertures.

5. A filter device as claimed in claim 1, adapted for use in an electric coffee maker, wherein the means comprise a chamber whose walls enclose the coffee cartridge, which chamber comprises an end wall situated opposite the wall of a filter material to which water is supplied, and the cartridge holder further comprises a receptacle for hot water from the coffee maker, the bottom of said receptacle being formed with a discharge aperture which communicates with a space between said end wall of the chamber and the wall of a filter material to which water is supplied.

6. A filter device, adapted for use in an electric coffee maker, comprising a coffee-cartridge holder and a coffee cartridge having two facing walls made of a filter material, one of said walls being adapted to receive water for making coffee and the other of said walls being adapted to deliver coffee to a receptacle, the filter device comprising means which ensure that, when the holder contains a coffee cartridge and is in the operating position, the wall of the filter material to which water is supplied is inclined at an angle between 15° and 90° to the horizontal, wherein said means comprise a chamber whose walls enclose the coffee cartridge, which chamber comprises an end wall situated opposite the wall of a filter material to which water is supplied, and the cartridge holder further comprises a receptacle for hot water from the coffee maker, the bottom of said receptacle being formed with a discharge aperture which communicates with a space between said end wall of the chamber and the wall of a filter material to which water is supplied.

7. A filter device as claimed in claim 6, wherein the coffee cartridge wall of a filter material to which water is added is flat.

8. A filter device as claimed in claim 6 or 7, wherein the filter device is provided with an outer vessel in which the cartridge holder can be placed, which outer vessel is formed with one or two discharge apertures.

9. A filter device comprising a coffee-cartridge holder and a coffee cartridge having two facing walls made of a filter material, one of said walls being adapted to receive water for making coffee and the other of said walls being adapted to deliver coffee to a receptacle, the filter device comprising means which ensure that, when the holder contains a coffee cartridge and is in the operating position, the wall of the filter material to which water is supplied is inclined at an angle between 15° and 90° to the horizontal and wherein said means further comprise two chambers, which chambers are each adapted to receive a coffee cartridge and have a common end wall, the bottom of the receptacle being formed with two discharge apertures which each communicate with said spaces in the respective chamber.

10. A filter device as claimed in claim 9, wherein a spring-loaded valve is arranged in each of said discharge apertures, each valve being actuated by a wall portion of the coffee cartridge when placed int he chamber.

11. A filter device as claimed in claim 9 or 10, wherein the filter device is provided with an outer vessel in which the cartridge holder can be placed, which outer vessel is formed with one or two discharge apertures.

* * * * *